(12) United States Patent
Haskell et al.

(10) Patent No.: US 6,707,949 B2
(45) Date of Patent: Mar. 16, 2004

(54) GENERALIZED SCALABILITY FOR VIDEO CODER BASED ON VIDEO OBJECTS

(75) Inventors: Barin Geoffry Haskell, Tinton Falls, NJ (US); Atul Puri, Riverdale, NY (US); Robert Lewis Schmidt, Howell, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 10/336,709

(22) Filed: Jan. 6, 2003

(65) Prior Publication Data

US 2003/0165274 A1 Sep. 4, 2003

Related U.S. Application Data

(63) Continuation of application No. 09/814,061, filed on Mar. 22, 2001, now Pat. No. 6,526,177, which is a continuation of application No. 09/111,215, filed on Jul. 7, 1998, now Pat. No. 6,233,356.
(60) Provisional application No. 60/069,888, filed on Jul. 8, 1997.

(51) Int. Cl.[7] .............................. G06K 9/36; G06K 9/46
(52) U.S. Cl. ....................... 382/243; 382/232; 382/233; 382/236; 375/240.08; 375/240.11
(58) Field of Search ................................. 382/232, 233, 382/236, 238, 239, 248, 250, 251, 240, 243; 348/408.1, 390.1, 400.1, 402.1, 416.1; 375/240.08, 240.11

(56) References Cited

U.S. PATENT DOCUMENTS

| | | |
|---|---|---|
| 4,958,226 A | 9/1990 | Haskell et al. |
| 5,408,328 A | 4/1995 | Boliek et al. |
| 5,414,469 A | 5/1995 | Gonzales et al. ............ 348/408 |
| 5,465,119 A | 11/1995 | Demos ........................ 348/447 |
| 5,467,136 A | 11/1995 | Odaka et al. ................ 348/416 |
| 5,488,418 A | 1/1996 | Mishima et al. ............. 348/398 |
| 5,532,747 A | 7/1996 | Yoon et al. .................. 348/416 |
| 5,539,468 A | 7/1996 | Suzuki et al. ................ 348/403 |
| 5,612,735 A * | 3/1997 | Haskell et al. ................. 348/43 |
| 5,619,256 A * | 4/1997 | Haskell et al. ................. 348/43 |
| 5,633,684 A | 5/1997 | Teranishi et al. ............ 348/398 |
| 5,699,117 A | 12/1997 | Uramoto et al. |
| 5,757,971 A | 5/1998 | Kim ............................ 348/409 |
| 5,778,097 A | 7/1998 | Nickerson |
| 5,825,421 A | 10/1998 | Tan ............................. 348/409 |
| 5,886,736 A * | 3/1999 | Chen ........................... 348/43 |
| 5,978,509 A | 11/1999 | Nachtergaele et al. |
| 5,999,189 A | 12/1999 | Kajiya et al. ............... 345/430 |
| 6,005,623 A | 12/1999 | Takahashi et al. .......... 348/402 |
| 6,005,980 A | 12/1999 | Eifrig et al. ................. 386/236 |
| 6,026,183 A * | 2/2000 | Talluri et al. ................ 382/194 |

(List continued on next page.)

OTHER PUBLICATIONS

A Puri et al. (Working Draft 1.0 of ISO/IEC 14496–2), Nov. 1996, version of:Jun. 12, 2001.*

(List continued on next page.)

*Primary Examiner*—Bhavesh M. Mehta
*Assistant Examiner*—Ali Bayat

(57) ABSTRACT

A video coding system that codes video objects as scalable video object layers. Data of each video object may be segregated into one or more layers. A base layer contains sufficient information to decode a basic representation of the video object. Enhancement layers contain supplementary data regarding the video object that, if decoded, enhance the basic representation obtained from the base layer. The present invention thus provides a coding scheme suitable for use with decoders of varying processing power. A simple decoder may decode only the base layer of video objects to obtain the basic representation. However, more powerful decoders may decode the base layer data of video objects and additional enhancement layer data to obtain improved decoded output. The coding scheme supports enhancement of both the spatial resolution and the temporal resolution of video objects.

19 Claims, 8 Drawing Sheets

U.S. PATENT DOCUMENTS

| | | | | |
|---|---|---|---|---|
| 6,043,846 | A | * 3/2000 | Shen et al. | 348/409 |
| 6,057,884 | A | * 5/2000 | Chen et al. | 348/416 |
| 6,097,842 | A | 8/2000 | Suzuki et al. | |
| 6,144,701 | A | * 11/2000 | Chiang et al. | 375/240 |
| 6,148,026 | A | 11/2000 | Puri et al. | |
| 6,330,280 | B1 | * 12/2001 | Suzuki et al. | 375/240.08 |

OTHER PUBLICATIONS

Index of Web Search.

Web site material, "Object–Based Coding," http://www.ece.concordia.ca/~sorial/seminar 1/node18.html, (Jul. 14, 1999).

Web site material, "MPEG–4 Video and Its Potential for Future Multimedia Services," http://wwwam.hhi.de/mpeg–video/papers/ sikora/iscas.htm (Jan. 27, 1997).

Web site material, "The Structure of the MPEG–4 Video Coding Algorithm", http://www.ee.iisc.ernet.in/people/students/gupta/ Mpeg4/Coding/fmpeg4vm.htm (Mar. 1, 1998).

Web site material, "MPEG–4: A Flexible Coding Standard for the Emerging Mobile Multimedia Applications", http://www.tnt.uni–hannover.de/project/eu/momusys/docs/Paper/IST/pimrc/pimrc.html (Oct. 9, 2000).

Haskell, Barry G., et al., "MPEG–4 and the Future", Digital Video: An Introduction to MPEG–2, pp. 369–371 (1997).

International Organization for Standardisation; Generic Coding of Moving Pictures and Associated Audio Information: Video; Recommendation H.262; ISO/IEC 13818–2 JTC1/SC29/WG11 N0702(revised) Incorporationg N702 Delta of 24 March and Further Editorial Corrections May 10, 1994.

International Organization for Standardisation; MPEG–4 Video Verification Model Version 2.1; ISO/IEC JTC1/SC29/WG11 XXXX of May 3, 1996.

*International Organization for Standardisation; Working Draft 1.0 of ISO/IEC 14496–2; ISO/IEC JTC1/SC29/WG11 N1470; MPEG/Maceio, Nov. 1996.*

*International Organization for Standardisation; Working Draft 4.0 of ISO/IEC 14496–2; ISO/IEC JTC1/SC29/WG11 N1797; MPEG97/Stockholm, Jul. 1997.*

*Organisation Internationale De Normalisation; MPEG–4 Proposal Package Description (PPD)—Revision 2 (Lausanne Revision)*; ISO/IEC JTC1/SC29/WG11; MPEG 95, Mar. 1995.

*International Organization for Standardization; Description and Results of Coding Efficient Experiment T9 (part 4) in MPEG–4 Video; ISO/IEC JTC1/WG11; MPEG96/1320,* Sep. 1996, Chicago.

*International Organization for Standardization; Results of Scalability Experiments; ISO/IEC JTC1/SC29/WG11;* MPEG96/1084, Jul. 1996 Tampere.

*International Organisation for Standardisation; Generic Coding of Moving Picture and Associated Audio Information; Video; ISO/IEC JTC1/SC29/WG11 NXXXX; ISO/IEC 13818–2, Nov. 1994.*

*International Organization for Standardisation; Test Model 5; ISO/IEC JTC1/SC29/WG11; MPEG93/457, Apr., 1993.*

*International Organization for Standardisation; Generic Coding of Moving Pictures and Associated Audio Information; Video Recommendation H.262; ISO/IEC JTC1/SC29/WG11, N0702 (revised), May 10, 1994.*

*ITU—Telecommunications Standardization SectorDocument: ITU–LBC–96 –358R1; Altered Sections of H.263 for Draft Text of H.263+; Shepperton, UK, Jul. 15–18, 1996.*

*International Organization for Standardisation; Intra Prediction (T9/T10) and DC/AC Prediction Results; ISO/IEC JTC1/SC29/WG11; MPEG96/0939, Jul. 1996.*

International Organization for Standardisation; MPEG–4 Video Verification Model Version 5.1; ISO/IEC JTC1/SC29/WG11; MPEG96/XXXX, Dec. 1996.

* cited by examiner

GENERALIZED SCALABILITY FOR VIDEO CODER BASED ON VIDEO OBJECTS

RELATED APPLICATION

This application is a continuation of Ser. No. 09/814,061, filed Mar. 22, 2001 and now U.S. Pat. No. 6,526,177; which is a continuation of 09/111,215, filed Jul. 7, 1998, now U.S. Pat. No. 6,233,356 which claims benefit from priority of U.S. Patent Application Ser. No. 60/069,888, filed Jul. 8, 1997, the disclosure of which is incorporated herein by reference. The invention also relates to the invention of U.S. patent application Ser. No. 08/827,142, filed Mar. 21, 1997, the disclosure of which is incorporated herein by reference.

BACKGROUND OF THE INVENTION

1. Field of the Invention

The present invention relates to a video coding system in which image data is organized into video objects and coded according to a scalable coding scheme. The coding scheme provides spatial scalability, temporal scalability or both.

2. Related Art

Video coding is a field that currently exhibits dynamic change. Video coding generally relates to any method that represents natural and/or synthetic visual information in an efficient manner. A variety of video coding standards currently are established and a number of other coding standards are being drafted. The present invention relates to an invention originally proposed for use in the Motion Pictures Experts Group standard MPEG-4.

One earlier video standard, known as "MPEG-2," codes video information as video pictures or "frames." Consider a sequence of video information to be coded, the sequence represented by a series of times. The MPEG-2 standard coded each frame according to one of three coding methods. A given image could be coded according to:

Intra-coding where the frame was coded without reference to any other frame (known as "I-pictures"), Predictive-coding where the frame was coded with reference to one previously coded frame (known as "P-pictures"), or Bi-directionally predictive coding where the frame was coded with reference to as many as two previously coded frames (known as "B-pictures").

Frames are not necessarily coded in the order in which they appear under MPEG-2. It is possible to code a first frame as an I-picture then code a fourth frame as a P-picture predicted from the I-picture. Second and third frames may be coded as B-pictures, each predicted with reference to the I- and P-pictures previously coded. A time index is provided to permit a decoder to reassemble the correct frame sequence when it decodes coded data.

MPEG4, currently being drafted, integrated the concept of "video objects" to I-, P- and B-coding. Video object based coders decompose a video sequence into video objects. An example is provided in FIGS. 1(a)–(d). There, a frame includes image data including the head and shoulders of a narrator, a suspended logo and a background. An encoder may determine that the narrator, logo and background are three distinct video objects, each shown separately in FIGS. 1(b)–(d). The video coder may code each separately.

Video object-based coding schemes recognize that video objects may remain in a video sequence across many frames. The appearance of a video object on any given frame is a "video object plane" or "VOP". VOPs may be coded as I-VOPs using intra coding techniques, as P-VOPs using predictive coding techniques or B-VOPs using bi-directionally predictive coding techniques. For each VOP, additional administrative data is transmitted with the coded VOP data that provides information regarding, for example, the video objects location in the displayed image.

Coding video information on a video object-basis may improve coding efficiency in certain applications. For example, if the logo were a static image, an encoder may code it as an initial I-VOP. However, for subsequent frames, coding the iogo as a P- or B-VOP would yield almost no image data. The P- or B-coding essentially amounts to an "instruction" that the original image information should be redisplayed for successive frames. Such coding provides improved coding efficiency.

One goal of the MPEG-4 standard is to provide a coding scheme that may be used with decoders of various processing power. Simple decoders should be able to decode coded video data for display. More powerful decoders should be able to decode the coded video data and obtain superior output such as improved image quality or attached functionalities. As of the priority date of this application, no known video object-based coding scheme provides such flexibility.

MPEG-2 provides scalability for its video picture-based coder. However, the scalability protocol defined by MPEG-2 is tremendously complicated. Coding of spatial scalability, where additional data for VOPs is coded into an optional enhancement layer, is coded using a first protocol. Coding of temporal scalability, where data of additional VOPs is coded in the enhancement layer, is coded using a second protocol. Each protocol is separately defined from the other and requires highly context specific analysis and complicated lookup tables in a decoder. The scalability protocol of the MPEG-2 is disadvantageous because its complexity makes it difficult to implement. Accordingly, there is a further need in the art for a generalized scalability protocol.

SUMMARY OF THE INVENTION

The present invention provides a video coding system that codes video objects as video object layers. Data of each video object may be segregated into one or more layers. A base layer contains sufficient information to decode a basic representation of the video object. Enhancement layers contain supplementary data regarding the video object that, if decoded, enhance the basic representation obtained from the base layer. The present invention thus provides a coding scheme suitable for use with decoders of varying processing power. A simple decoder may decode only the base layer to obtain the basic representation. However, more powerful decoders may decode the base layer data and additional enhancement layer data to obtain improved decoded output.

DETAILED DESCRIPTION

The present invention introduces a concept of "video object layers" to the video object-based coding scheme. Data of each video object may be assigned to one or more layers of the video object and coded. A base layer contains sufficient information to represent the video object at a first level of image quality. Enhancement layers contain supplementary data regarding the video object that, if decoded, improve the image quality of the base layer. The present invention thus provides an object based a coding scheme suitable for use with decoders of varying processing power. A simple decoder may decode only the base layer of objects to obtain the basic representation. More powerful decoders may decode the base layer data and additional enhancement layer data of objects to obtain improved decoded output.

Figure 1A:
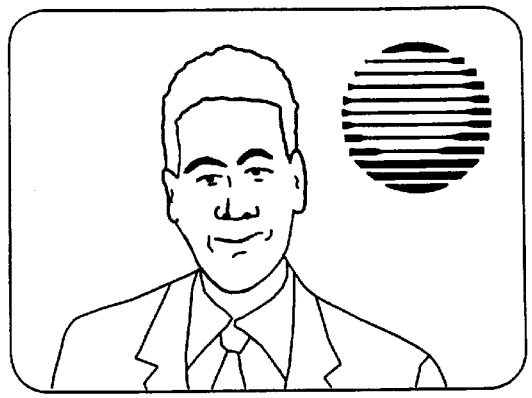
FIGS. 1(a)–(d) provide an example of video data and video objects that may be derived therefrom.
Figure 1B:
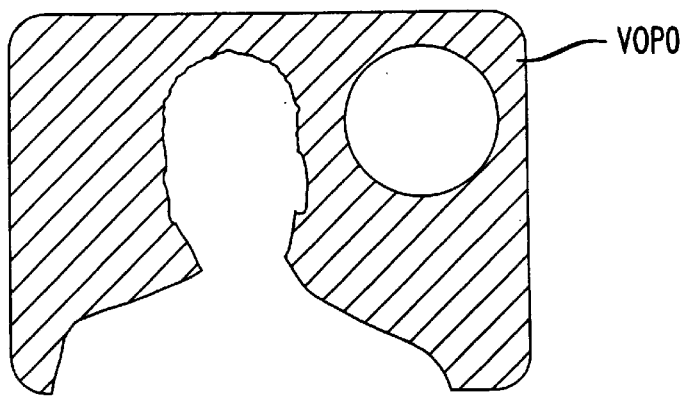
Figure 1C:
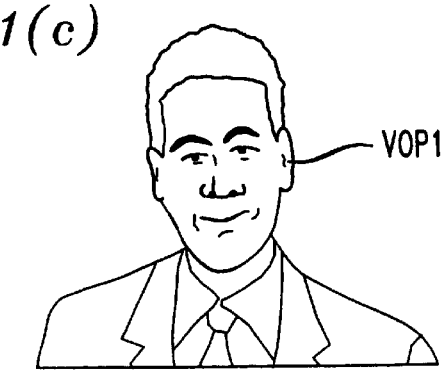
Figure 1D:
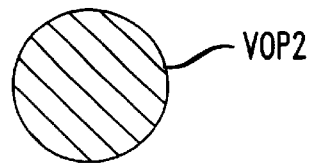
Figure 2:
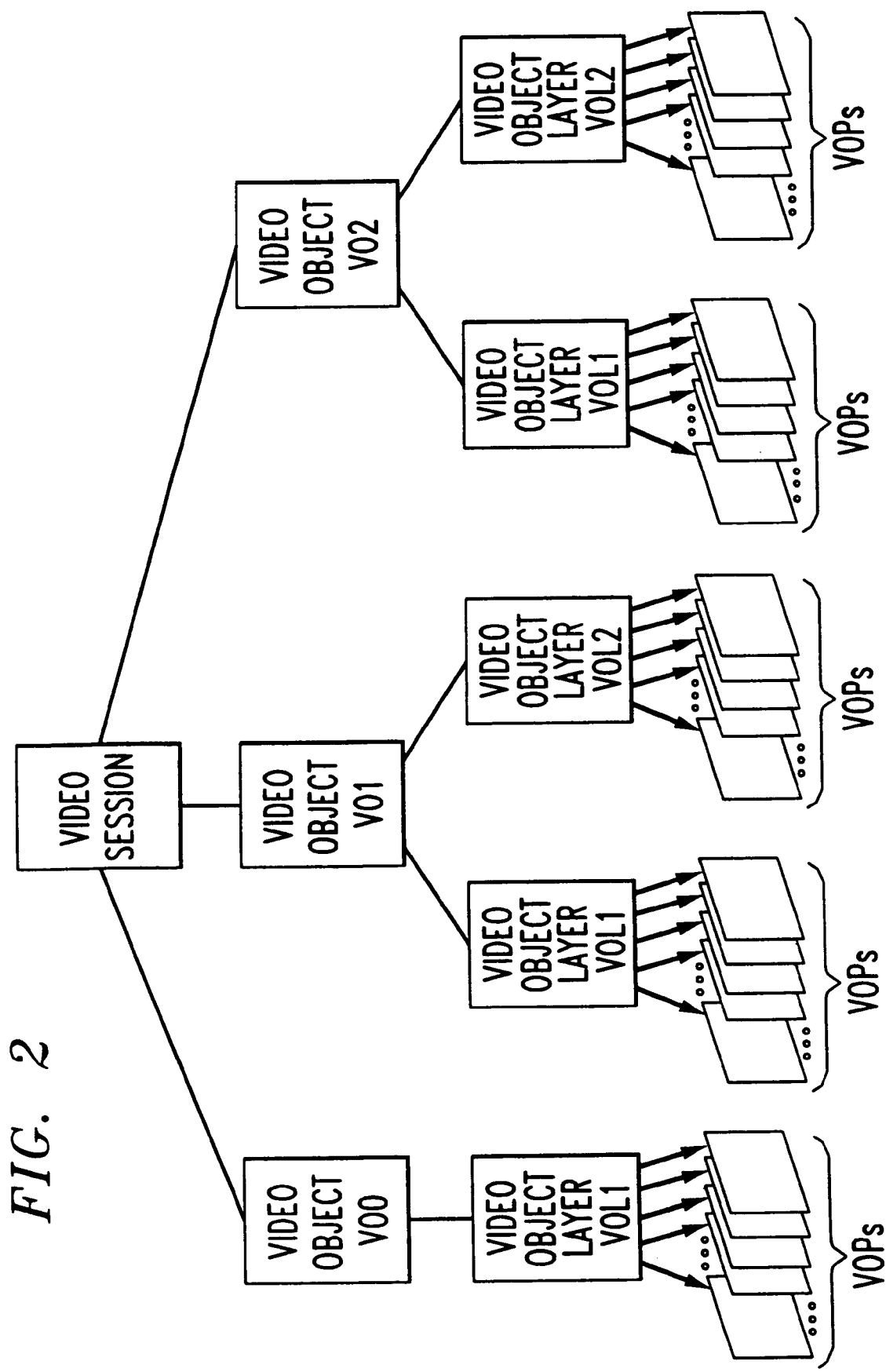
FIG. 2 is an organizational chart illustrating a video coding hierarchy established by the present invention.

FIG. 2 illustrates an organizational scheme established by the present invention. An image sequence to be coded is a video session. The video session may be populated by a number of video objects. Each video object may be populated by one or more video object layers. A video object layer is an organizational artifact that represents which part of the coded bitstream output by the video coder carries certain image information related to the video object. For example, base layer data may be assigned to a first video object layer (layers VOL1 for each video object VOØ, VO1 and VO2 in FIG. 2). Enhancement layer data may be assigned to a second video object layer, such as VOL2 in each of VO1 and VO2. The video object layers are themselves populated by video object planes.

Enhancement layers need not be provided for every video object. For example, FIG. 2 illustrates a video session that provides only a single video object layer for video object VOØ.

There is no limit to the number of video object layers that may be provided for a single video object. However, each video object layer added to a video object will be associated with a certain amount of administrative information required to code the video object layer. The overhead administrative data can impair coding efficiency.

Figure 3:
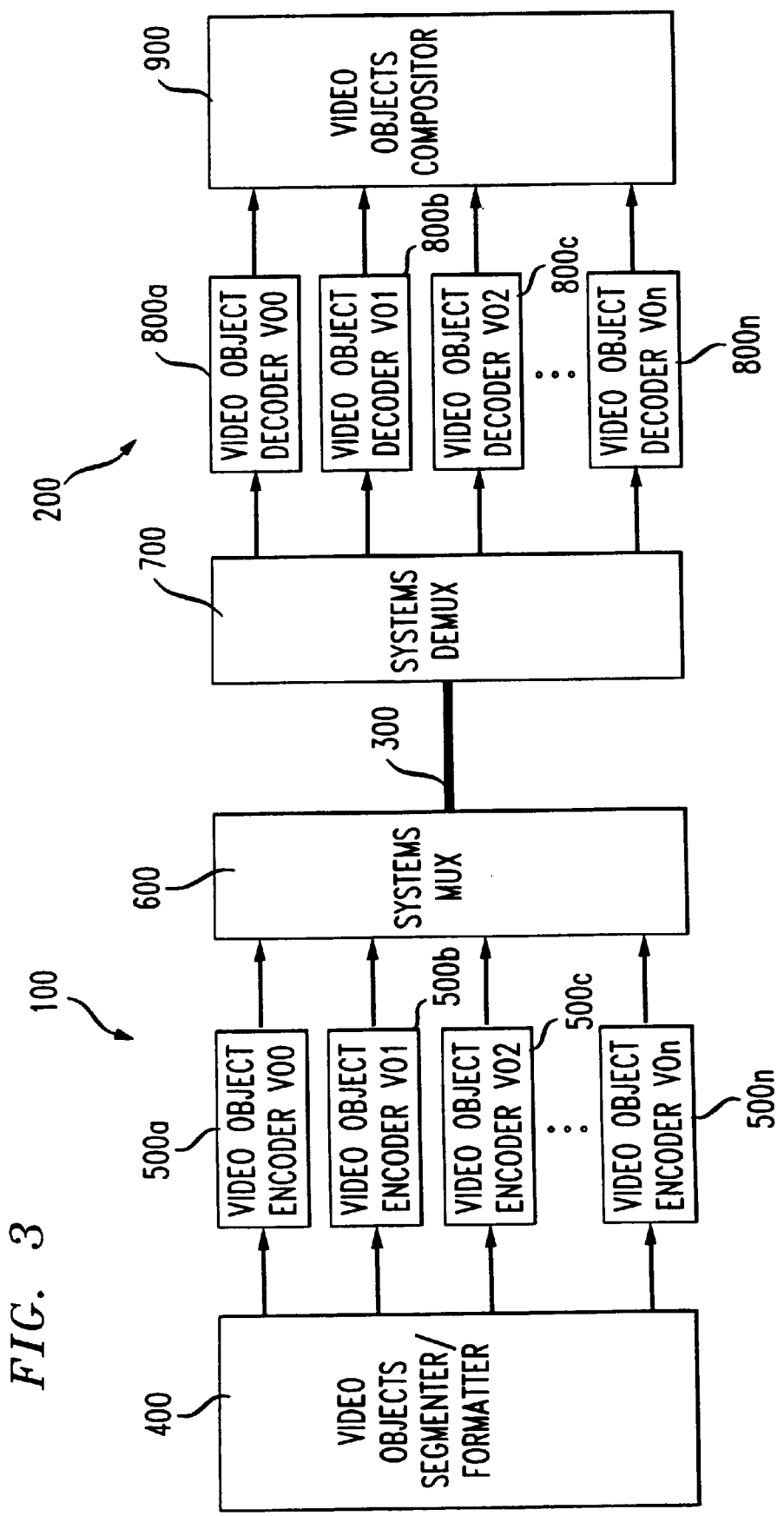
FIG. 3 illustrates an object based video coder constructed in accordance with an embodiment of the present invention.

FIG. 3 illustrates a video coding system constructed in accordance with an embodiment of the present invention. The coding system includes an encoder 100 and a decoder 200 separated by a channel 300. The encoder 100 receives input video objects data and codes the video objects data according to the coding scheme described above with respect to FIG. 2. The encoder 100 outputs coded data to the channel 300. The decoder 200 receives the coded data from the channel 300 and decodes it using techniques complementary to those used at the encoder 100. The decoder outputs decoded video data for display, storage or other use.

The channel 300 may be a real time data medium in which coded data output from the encoder 100 is routed directly to the decoder 200. As such, the channel 300 may be represented by a data communication channel provided by the Internet, a computer network, a wireless data network or a telecommunication network. The channel 300 may also be a storage medium, such as a magnetic, optical or electrical memory. In these applications, the encoder 100 and decoder 200 need not work contemporaneously. The encoder 100 may store coded data in the channel 300 where the coded data may reside until retrieved by the decoder 200.

The encoder 100 includes a video object segmenter/formatter 400, plurality of video object encoders 500a–n and a systems multiplexer ("MUX") 600. In a typical application, the encoder 100 may be a microprocessor or digital signal processor that is logically divided into these components 400–600 by program instructions. Alternatively, the components 400–600 may be populated by hardware components adapted to perform these functions.

The video objects segmenter/formatter 400 receives input video data and identifies video objects therefrom. The process of decomposing an image sequence into video objects is well known and described in "Coding of Moving Pictures and Video," ISO/IEC 14496-2 (July 1997). The video object segmenter/formatter 400 outputs VOP data to each of the video object encoders 500a–n.

The video object encoders 500a–n receive the VOP data of their respective video objects and code the VOP data according to the structure shown in FIG. 2. That is, the video object encoder (say, 500a) determines how many video object layers to use in coding the video object data. It determines what part of the input VOP data is coded as base layer data and what part is coded as enhancement layer data. The video object encoder codes the base layer data and any enhancement layer data as coded VOPs of each video object layer. It outputs coded video object data to the MUX 600.

The MUX 600 organizes the coded video object data received from each of the video object encoders 500 into a data stream and outputs the data stream to the channel 300. The MUX 600 may merge data from other sources, such as audio coders (not shown), graphics coder (not shown), into the unitary signal stream.

The decoder 200 includes a systems demultiplexer ("DEMUX") 700, a plurality of video object decoders 800a–n and a video objects compositor 900. As with the encoder 100, the decoder 200 may be a microprocessor or digital signal processor that is logically divided into these components 700–900 by program instructions. Alternatively, the components 700–900 may be populated by hardware components adapted to perform these functions.

The DEMUX 700 retrieves the unitary coded signal from the data stream channel 300. It distinguishes the coded data of the various video objects from each other. Data for each video object is routed to a respective video object decoder 800a–n. Other coded data, such as graphics data or coded audio data, may be routed to other decoders (not shown).

The video object decoders 800a–n decode base layer data and any enhancement layer data using techniques complementary to those applied at the video object encoders 500a–n. The video object decoders 800a–n output decoded video objects.

The video objects compositor 900 assembles a composite image from the decoded VOP data of each video object. The video objects compositor 900 outputs the composite image to a display, memory or other device as determined by a user.

Figure 4:
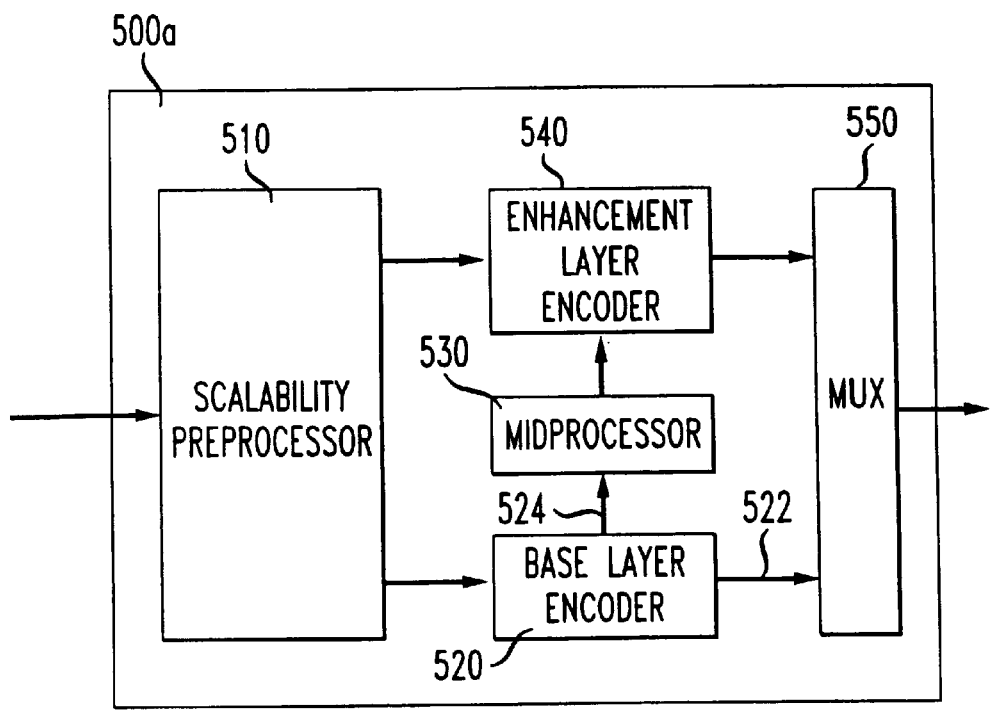
FIG. 4 is a block diagram of a video object encoder constructed in accordance with an embodiment of the present invention.

FIG. 4 is a block diagram of a video object encoder 500*a* of the present invention. The video object encoder includes a scalability pre-processor 510, a base layer encoder 520, a midprocessor 530, an enhancement layer encoder 540 and an encoder multiplexer 550. Again, the components of the video object encoder 500*a* may be provided in hardware or may be logical devices provided in a microprocessor or a digital signal processor.

VOP data of a video object is input to the scalability pre-processor 510. The scalability pre-processor 510 determines which data is to be coded in the base layer and which data is to be coded in the enhancement layer. It outputs a first set of VOPs to the base layer encoder 520 and a second set of VOPs to the enhancement layer encoder 540.

The base layer encoder 520 codes base layer VOPs according to conventional techniques. Such coding may include the nonscalable coding techniques of the MPEG-4 standard. Base layer VOPs are coded by intra coding, predictive coding or bi-directionally predictive coding and output on line 522 to the encoder multiplexer MUX 550. The base layer encoder also outputs locally decoded VOPs on line 524. The base layer encoder obtains locally decoded VOPs by decoding the coded base layer data. Effectively, the locally decoded VOPs mimic decoded base layer data that is obtained at the decoder 200.

The midprocessor 530 receives the locally decoded VOPs and depending on its mode of operation, outputs up sampled, down sampled or unchanged VOP data to the enhancement layer encoder 540.

The enhancement layer encoder 540 receives VOP data from the scalability preprocessor 510 and locally decoded VOP data possibly having been modified by the midprocessor 530. The enhancement layer encoder 540 codes the VOP data received from the scalability preprocessor using the locally decoded VOP data as a basis for prediction. It outputs coded enhancement layer data to the encoder multiplexer 550.

The encoder multiplexer MUX 550 outputs coded base and enhancement layer video object data from the video object encoder.

Figure 5:
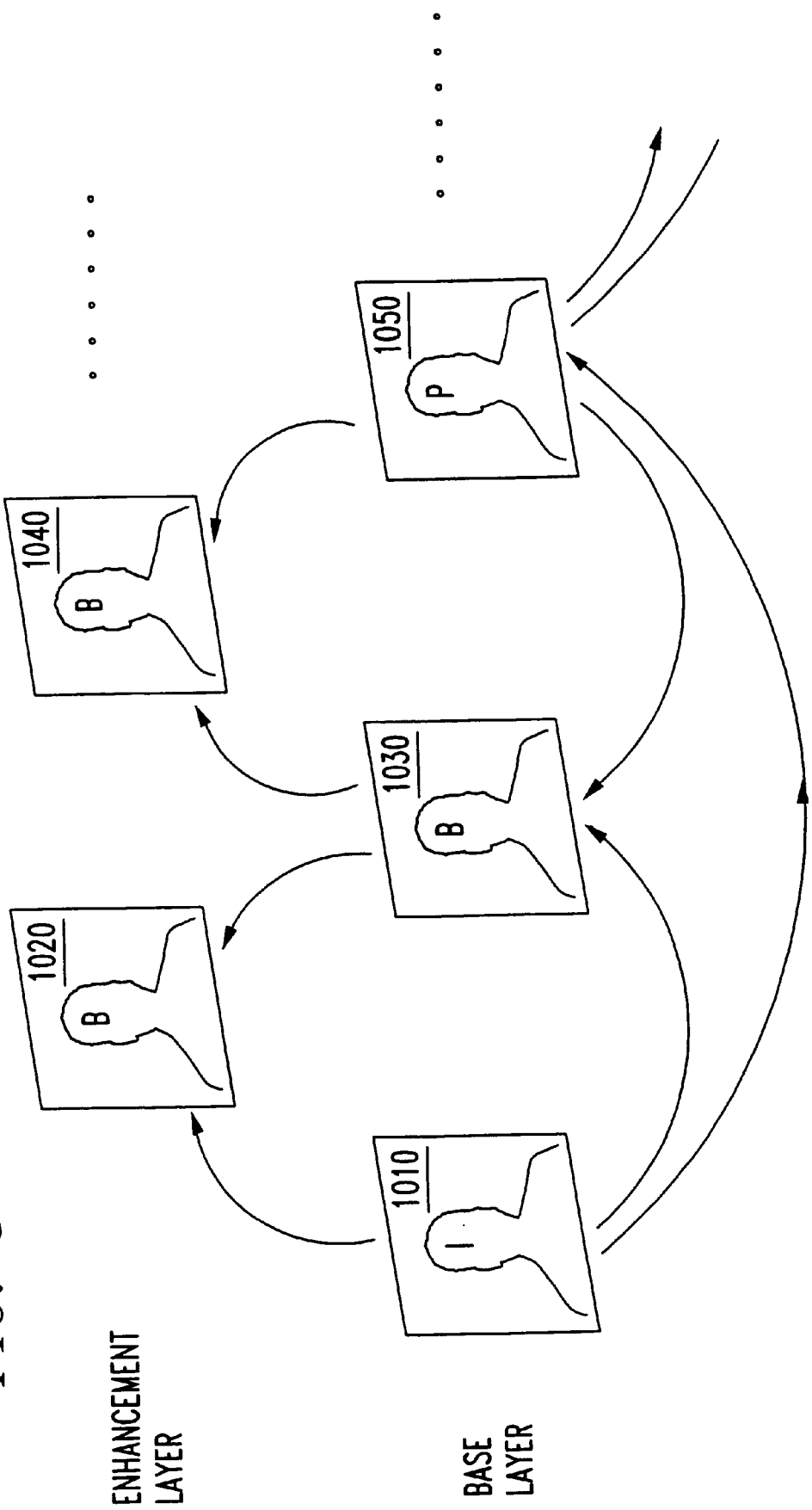
FIG. 5 illustrates an application of temporal scalability provided by the present invention.

FIG. 5 illustrates an example of object based temporal scalability that may be achieved by the present invention. There, a first sequence of VOPs 1010, 1030, 1050, . . . are coded by the base layer encoder 520 and a second sequence of VOPs 1020, 1040, . . . are coded by the enhancement layer encoder 540. In time order, the VOPs appear in the order: 1010, 1020, 1030, 1040, 1050, . . . .

The base layer encoder 520 codes VOP 1010 first as an I-VOP. Second, it codes VOP 1050 as a P-VOP using VOP 1010 as a basis for prediction. Third, it codes VOP 1030 as a B-VOP using VOPs 1010 and 1050 as bases for prediction.

The enhancement layer encoder 540 codes VOP 1020 using base layer locally decoded VOPs 1010 and 1030 as bases for prediction. It also codes VOP 1040 using base layer locally decoded VOPs 1030 and 1050 as bases for prediction. Although not shown in FIG. 5, an enhancement layer VOP (such as 1040) can look to another enhancement layer VOP as a basis for prediction. For example, VOP 1040 could be coded using VOPs 1020 as a basis for prediction.

On decoding, a simple decoder decodes only the coded base layer data. It decodes and displays VOPs 1010, 1030, 1050, . . . providing a video sequence for display having a first frame rate. A power decoder, however, that decodes both base layer and enhancement layer data obtains the entire VOP sequence 1010, 1020, 1030, 1040, 1050, . . . . It decodes a video sequence having a higher frame rate. With a higher frame rate, an observer would perceive more natural motion.

Figure 6:
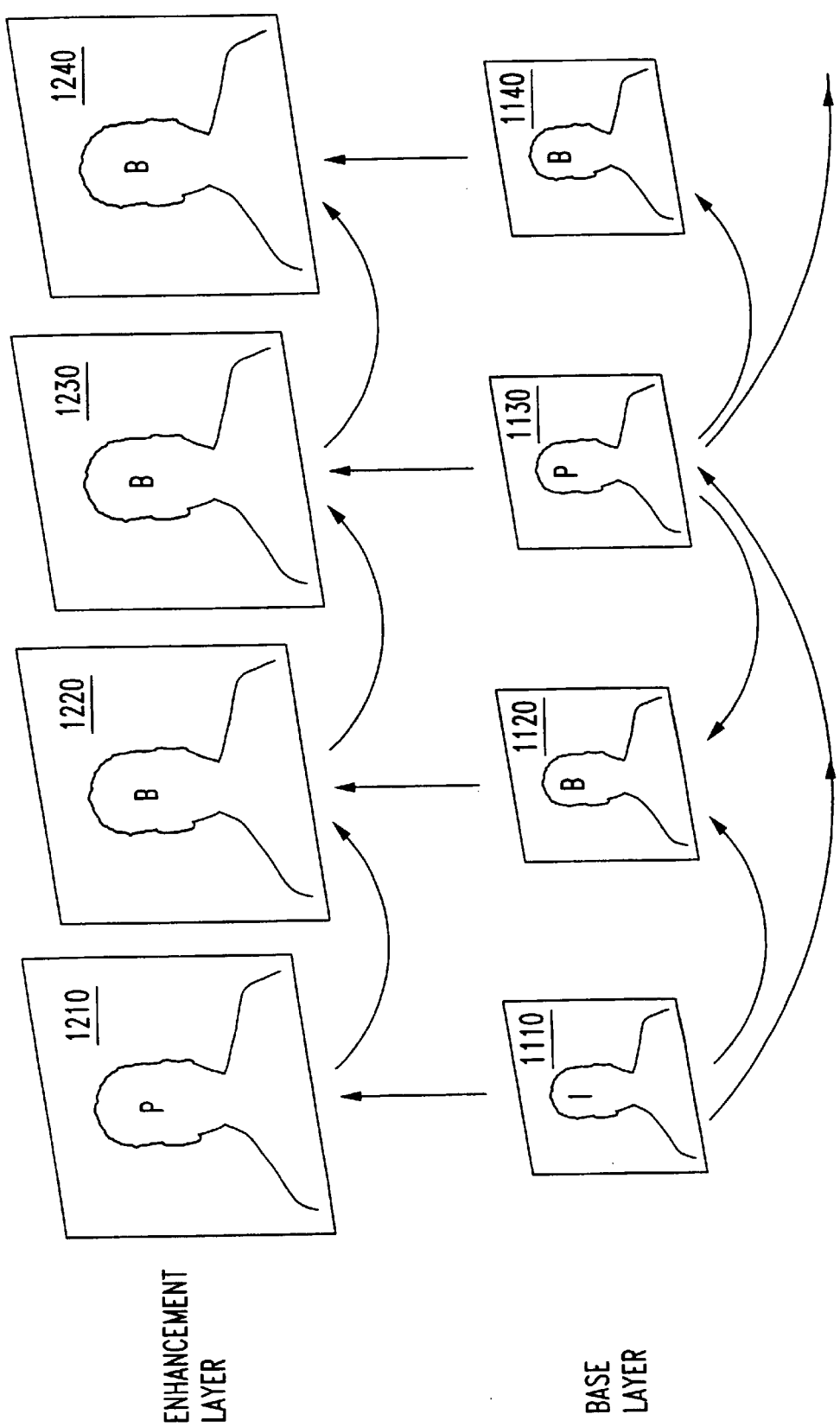
FIG. 6 illustrates an application of spatial scalability provided by the present invention.

FIG. 6 illustrates an example of object based spatial scalability that may be achieved by the present invention. There, VOPs 1110–1140 are coded by the base layer encoder 520. Spatially, larger VOPs 1210–1240 are coded by the enhancement layer encoder 540. Enhancement layer VOPs 1210–1240 coincide, frame for frame, with the base layer VOPs 1110–1140.

The base layer encoder 520 codes the base layer VOPs in the order 110, 130, 1120, . . . . VOP 1110 is coded as an I-VOP. VOP 1130 is coded as a P-VOP using VOP 1110 as a basis for prediction. VOP 1120 is coded third as a B-VOP using VOPs 1110 and 1130 as a basis for prediction. VOP 1140 is coded sometime thereafter using VOP 1130 and another VOP (not shown) as a basis for prediction.

The enhancement layer encoder 540 codes the enhancement layer VOPs in the order 1210, 1220, 1230, 1240, . . . . As shown in FIG. 6, VOP 1210 is a P-VOP coded using VOP 1110 as a basis for prediction. VOP 1220 is coded as a B-VOP using base layer VOP 1120 and enhancement layer VOP 1210 as a basis for prediction. VOPs 1230 and 1240 are coded in a manner similar to VOP 1220; they are coded as B-VOPs using the temporally coincident VOP from the base layer and the immediately previous enhancement layer VOP as a basis for prediction.

On decoding, a simple decoder that decodes only the coded base layer data obtains the smaller VOPs 1110–1140. However, a more powerful decoder that decodes both the coded base layer data and the coded enhancement layer data obtains a larger VOP. On display, the decoded video object may be displayed as a larger image or may be displayed at a fixed size but may be displayed with higher resolution.

Scalability also provides a graceful degradation in image quality in the presence of channel errors. In one application, the coded base layer data may be supplemented with error correction coding. As is known, error correction coding adds redundancy to coded information. Error coded signals experience less vulnerability to transmission errors than signals without error coding. However, error coding also increases the bit-rate of the signal. By providing error correction coding to the coded base layer data without providing such coding to the coded enhancement layer data, an intermediate level of error protection is achieved without a large increase in the bit rate. Enhancement layer VOPs are not error coded, which would otherwise reduce the transmitted bit rate of the unified signal. When channel errors occur, the coded base layer data is protected against the errors. Thus, at least a basic representation of the video object is maintained. Graceful signal degradation is achieved in the presence of channel errors.

Figure 7:
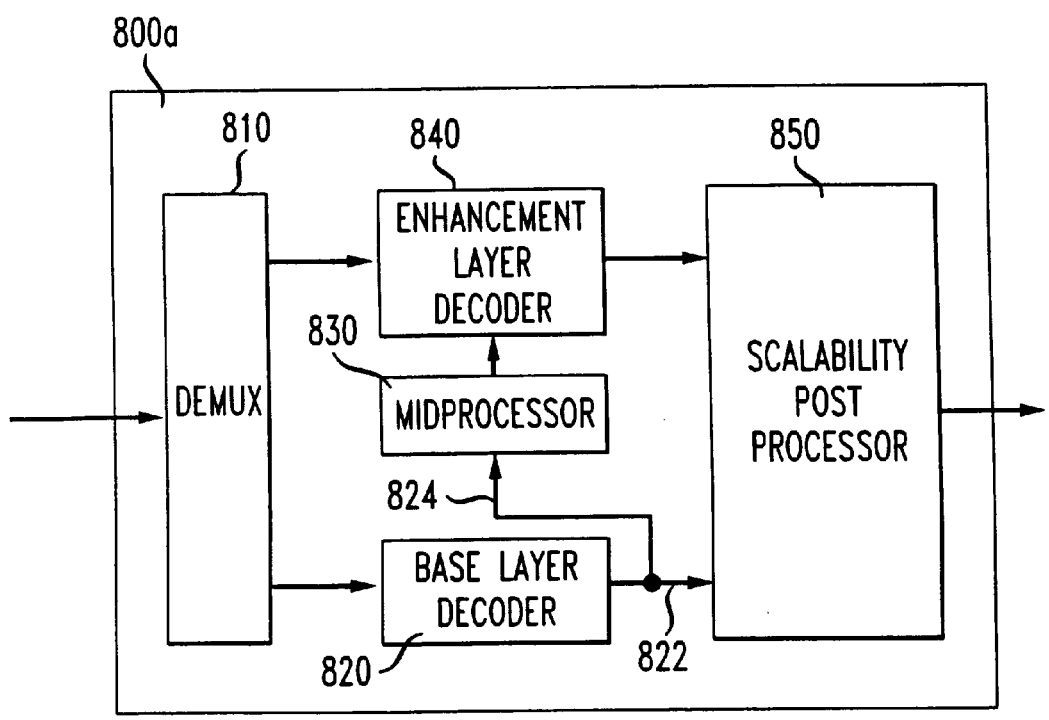
FIG. 7 is a block diagram of a video object decoder constructed in accordance with an embodiment of the present invention.

FIG. 7 illustrates a block diagram of a video object decoder 800*a* constructed in accordance with an embodiment of the present invention. The video object decoder 800*a* includes a decoder demultiplexer (DEMUX) 810, a base layer decoder 820, a midprocessor 830, an enhancement layer decoder 840 and a scalability post-processor 850. The components of the video object decoder 800*a* may be provided in hardware or may be logical devices provided in a microprocessor or a digital signal processor.

The DEMUX 810 receives the coded video object data from the system demultiplexer 700 (FIG. 3). It distinguishes coded base layer data from coded enhancement layer data and routes each type of data to the base layer decoder 820 and enhancement layer decoder 840 respectively.

The base layer decoder 820 decodes the coded base layer data to obtain base layer VOPs. It outputs decoded base layer VOPs on output 822. In the absence of channel errors, the decoded base layer VOPs should represent identically the locally decoded VOPs output on line 524 from the base layer encoder 520 to the midprocessor 530 (FIG. 4). The decoded base layer VOPs are input to the scalability post processor 850 and to the midprocessor 830 (line 524).

The decoder midprocessor 830 operates identically to the encoder midprocessor 530 of FIG. 4. If midprocessor 530 had up sampled locally decoded VOPs, midprocessor 830 up samples the decoded base layer VOPs. If midprocessor 530 had down sampled or left unchanged the locally decoded VOPs, midprocessor 830 also down samples or leaves unchanged the decoded base layer VOPs. An output of the midprocessor 830 is input to the enhancement layer decoder 840.

The enhancement layer decoder 840 receives coded enhancement layer data from the DEMUX 810 and decoded base layer data (possibly modified) from the midprocessor 830. The enhancement layer decoder 840 decodes the coded enhancement layer data with reference to the decoded base layer data as necessary. It outputs decoded enhancement layer VOPs to the scalability post-processor 850.

The scalability post-processor 850 generates composite video object data from the decoded base layer data and the decoded enhancement layer data. In the case of temporal scalability, the scalability post-processor 850 reassembles the VOPs in the correct time ordered sequence. In the case of spatial scalability, the scalability post-processor outputs the decoded enhancement layer data. The decoded base layer data is integrated into the decoded enhancement layer VOPs as part of the decoding process.

Figure 8:
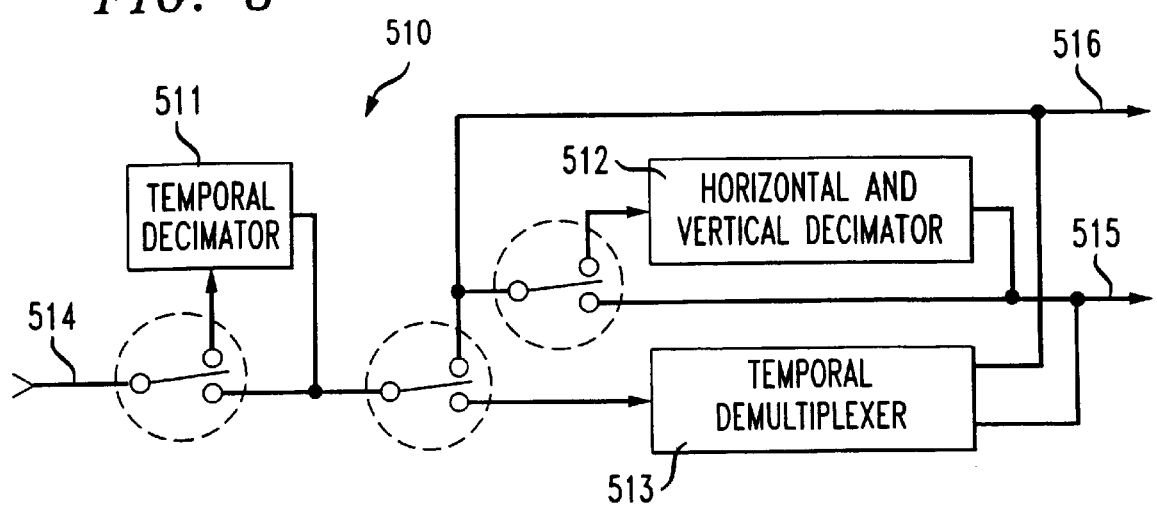
FIG. 8 is a block diagram of a scalability preprocessor constructed in accordance with an embodiment of the present invention.

FIG. 8 illustrates a block diagram of the scalability pre-processor 510 (FIG. 4). The scalability pre-processor 510 includes a temporal decimator 511, a horizontal and vertical decimator 512 and a temporal demultiplexer 513. It can perform spatial resolution reduction (horizontal and/or vertical) and temporal resolution reduction by dropping intermediate pictures or VOPs as necessary. VOPs input to the scalability pre-processor are input on line 514. The scalability pre-processor outputs VOPs to the base layer decoder on line 515 and other VOPs to the enhancement layer decoder on line 516.

The temporal decimator 511 reduces the VOP rate of both the base layer and the enhancement layer by dropping predetermined VOPs.

The temporal demultiplexer is used for temporal scalability. For a given VOP input to it, the temporal demultiplexer 513 routes it to either the base layer decoder (over output 515) or to the enhancement layer decoder (over output 516).

The horizontal and vertical decimator 512 may be used for spatial scalability. Each VOP input to the scalability pre-processor (or, at least, those output from the temporal decimator) is output directly to the enhancement layer decoder over line 516. The VOPs are also input to the horizontal and vertical decimator where image data of each VOP is removed to shrink them. The shrunken VOPs output from the horizontal and vertical decimator are output to the base layer encoder over line 515.

Figure 9:
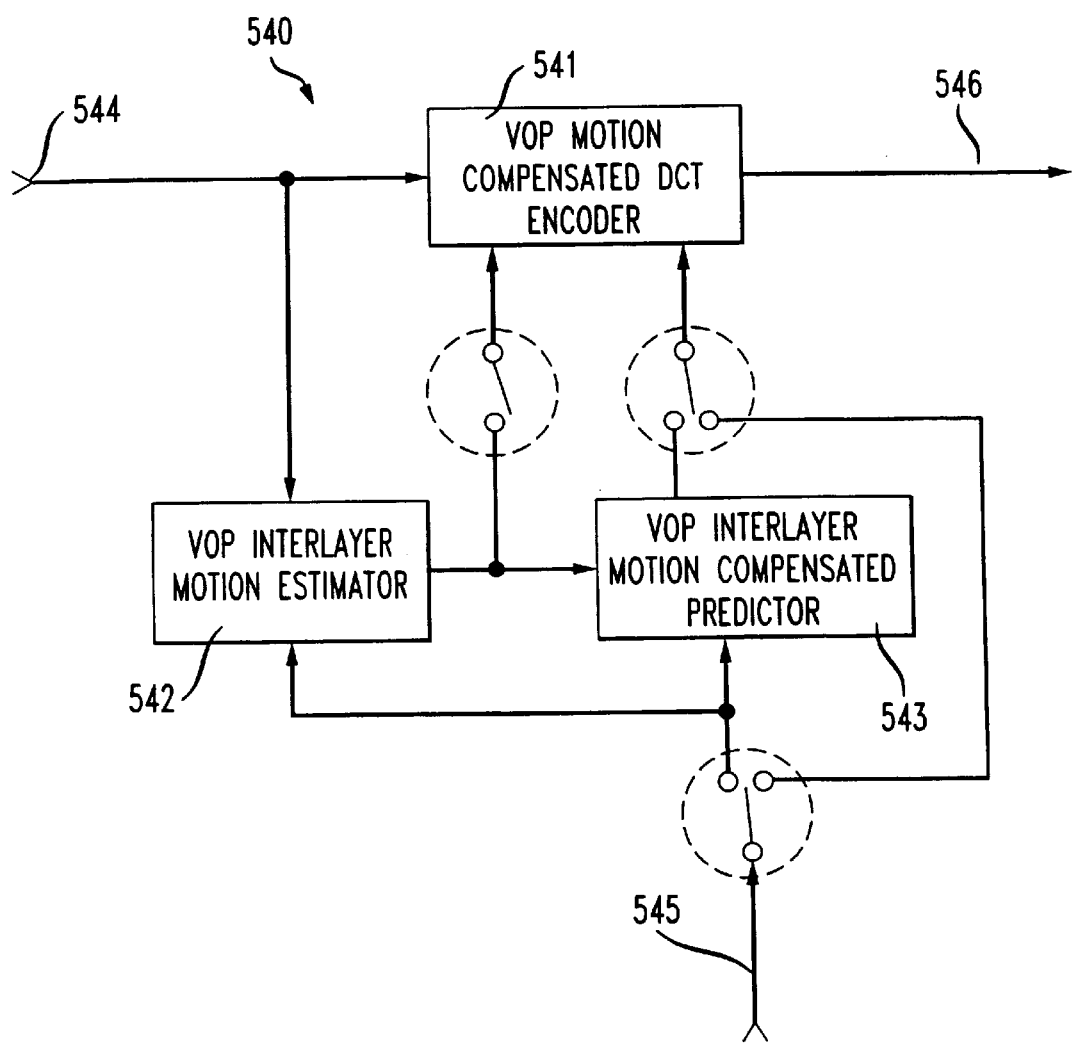
FIG. 9 is a block diagram of an enhancement layer encoder constructed in accordance with an embodiment of the present invention.

FIG. 9 is a block diagram of an enhancement layer encoder 540 for video objects constructed in accordance with the present invention. The enhancement layer encoder 540 includes a VOP Motion Compensated DCT Encoder 541, a VOP Interlayer Motion Estimator 542 ("VIME") and a VOP Interlayer Motion Compensated Predictor 543. It receives the enhancement layer VOPs from the scalability pre-processor 510 at input 544 and the locally decoded base layer VOPs (possibly modified) at input 545. The enhancement layer encoder outputs the coded enhancement layer data on output 546.

The enhancement layer encoder 540 receives the enhancement layer VOPs from=the scalability pre-processor 510 on input 544. They are input to the VOP Motion Compensated DCT Encoder 541 and to the VOP Interlayer Motion Estimator 542. The VOP Motion Compensated DCT Encoder 541 is a motion compensated transform encoder that is adapted to accept a predicted VOP and motion vectors as inputs. The motion vectors are generated by VIME 542, a normal motion estimator that has been adapted to accept enhancement layer VOPs from input 544.

VIME 542 performs motion estimation on an enhancement layer VOP with reference to a locally decoded base layer VOP. It outputs motion vectors to the VOP Interlayer Motion Compensated Predictor 543 and, selectively, to the VOP Motion Compensated DCT Encoder 541.

The VOP Interlayer Motion Compensated Predictor 543 is a normal motion compensated predictor that operates on the locally decoded base layer VOPs received from the midprocessor 530. It obtains a prediction from one or two possible sources of prediction. In a first prediction, prediction is made with reference to a first VOP. In a second prediction, prediction is made with reference to a second VOP. A third prediction obtains an average of the first and second predictions. The source of predictions, the first and second VOPs, may be located in either the base layer or enhancement layer. Arrows in FIGS. 5 & 6 illustrate exemplary prediction directions.

In an MPEG-4 system image data of video objects is organized into blocks of image data. Prediction according to the three predictions described above may be performed on a block by block basis. Thus a first block of a VOP may be predicted using prediction 1 (First VOP), a second block may be predicted using prediction 2 (second VOP), and a third block may be predicted using prediction 3 (both VOPs). In the embodiment, the first and second VOPs are properly viewed as possible sources for prediction because they may be used as sources for prediction but are not necessary used.

The VOP Interlayer Motion Compensated Predictor 543 outputs predicted VOPs. The output of the VOP Interlayer Motion Compensated Predictor 543 or the locally decoded base layer VOPs are input to the VOP Motion Compensated DCT Encoder 541.

Figure 10:
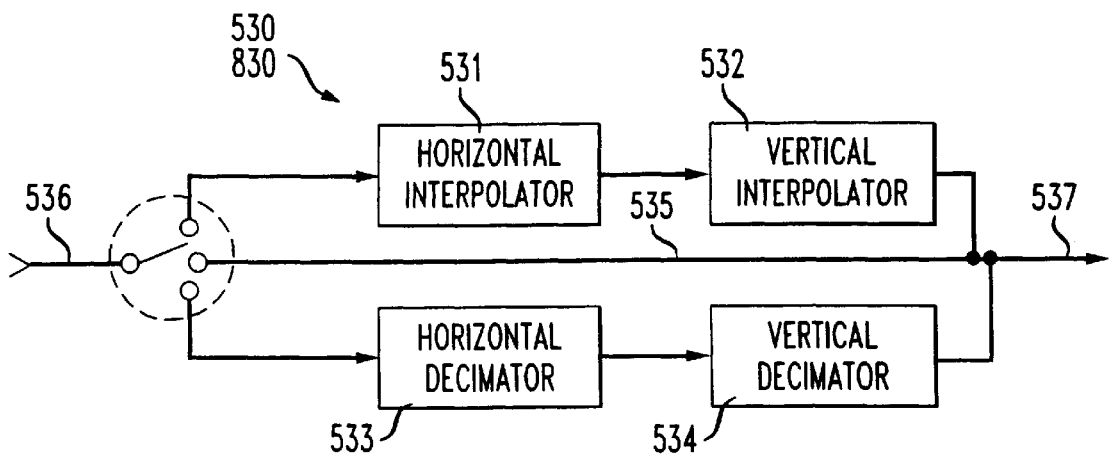
FIG. 10 is a block diagram of a midprocessor constructed in accordance with an embodiment of the present invention.

FIG. 10 is a block diagram of a midprocessor 530, 830 constructed in accordance with an embodiment of the present invention. The midprocessor 530, 830 includes a horizontal interpolator 531 and a vertical interpolator 532 on a first processing path, a horizontal decimator 533 and a vertical decimator 534 on a second processing path and a third, shunt path 535. It receives VOPs on input 536 and outputs VOPs on an output 537.

The horizontal interpolator 531 and vertical interpolator 532 are enabled when the midprocessor 530, 830 operates in an up sampling mode. For each VOP, the horizontal interpolator 531 and vertical interpolator 532 enlarge the VOP and calculate image data for data point(s) between original data points.

The horizontal decimator 533 and vertical decimator 534 are enabled when the midprocessor 530, 830 operates in down sampling mode. The horizontal decimator 533 and vertical decimator 534 reduce the VOP and remove image data for certain of the original data points.

The shunt path 535 outputs untouched the VOPs input to the midprocessor 530, 830.

Figure 11:
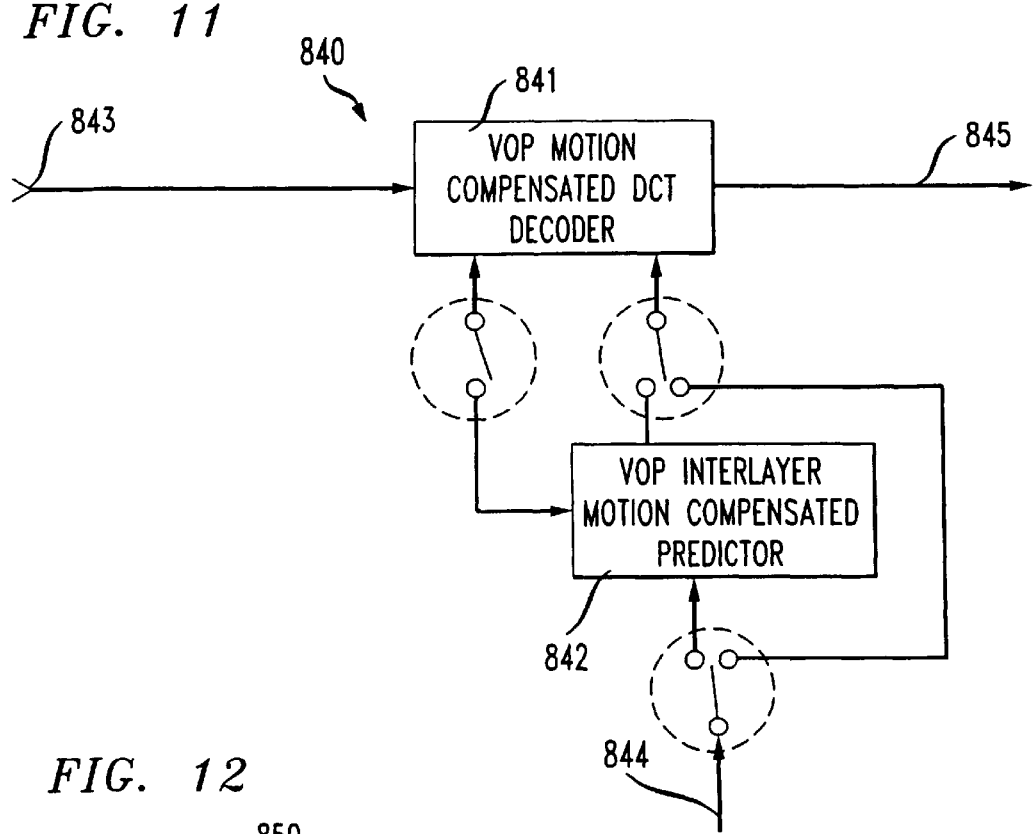
FIG. 11 is a block diagram of an enhancement layer decoder constructed in accordance with an embodiment of the present invention.

FIG. 11 is a block diagram of the enhancement layer decoder of video objects 840 of FIG. 7. The enhancement layer decoder 840 includes a VOP Motion Compensated DCT Decoder 841 and a VOP Interlayer Motion Compensated Predictor 842. The coded enhancement layer data is input to the enhancement layer decoder on input 843. Decoded base layer VOPs received from the midprocessor 830 are input to the enhancement layer decoder on input 844. The enhancement layer decoder 840 outputs decoded enhancement layer VOPs on output 845.

The VOP Motion Compensated DCT Decoder 841 decodes motion vectors as well as the prediction mode from the coded enhancement layer data and outputs them to the VOP Interlayer Motion Compensated Predictor 842 along with decoded enhancement layer previous VOP. The VOP Interlayer Motion Compensated Predictor 842 also receives the decoded base layer VOPs from line 844. The VOP Interlayer Motion Compensated Predictor 842 outputs predicted VOPs back to the VOP Motion Compensated DCT Decoder 841. Based upon either the enhanced layer previous decoded VOPs or the decoded base layer VOPs, or their combination, the VOP Motion Compensated DCT Decoder 841 generates the decoded enhancement layer VOPs. Among the combinations allowed at the encoder are one-half of previous decoded enhancement layer VOP and one-half of the base layer VOP, as well as one-half of a previous and a next decoded VOP of base layer.

Figure 12:
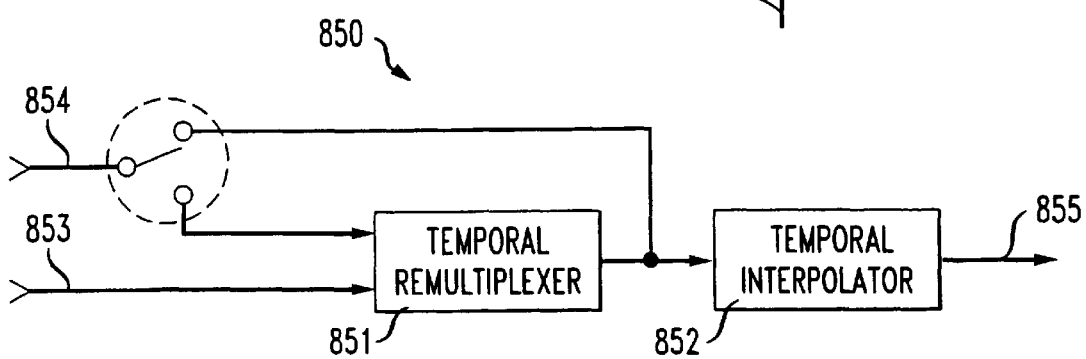
FIG. 12 is a block diagram of a scalability post-processor constructed in accordance with an embodiment of the present invention.

FIG. 12 is a block diagram of the scalability post-processor 850. It includes a temporal multiplexer 851 and a temporal interpolator 852. The scalability post-processor 850 receives decoded base layer data on input 853 and decoded enhancement layer VOPs on input 854. It outputs composite video object data on output 855.

The temporal multiplexer 851 reassembles the VOPs from the base layer and the enhancement layer into a single stream of VOPs. The temporal interpolator 852 is used for temporal scalability to rearrange VOPs into the correct time ordered sequence. For spatial scalability, the decoded base layer VOPs may be ignored; the decoded enhancement layer data bypasses the temporal multiplexer 851.

The temporal interpolator 852 increases the frame rate of the VOPs in a manner that complements the temporal decimator 511 of the video object encoder 500*a* (FIG. 8). If the temporal decimator 511 was bypassed for encoding, the temporal interpolator 852 may be bypassed during decoding.

As has been shown, the present invention provides a system providing scalability, either temporal scalability, spatial scalability or both. VOPS are separated into base layer VOPs and enhancement layer VOPs and coded as such. On decoding, a specific decoder may decode the coded base layer data with or without the coded enhancement layer data, depending on it processing power and channel conditions.

The present invention also provides a general scalability syntax while coding.

Generalized scalability allows predictions to be correctly formed at the decoder by embedding the necessary codes indicating the specific type of temporal scalability or spatial scalability to be derived. The reference VOPs for prediction are selected by reference_select_code as described in Tables 1 and 2. In coding P-VOPs belonging to an enhancement layer, the forward reference can be one of the follow-ing three: the most recent decoded VOP of enhancement layer, the most recent VOP of the lower layer in display order, or the next VOP of the lower layer in display order.

In B-VOPs, the forward reference can be one of the two: the most recent decoded enhancement VOP or the most recent lower layer VOP in display order. The backward reference can be one of the three: the temporally coincident VOP in the lower layer, the most recent lower layer VOP in display order, or the next lower layer VOP in display order.

TABLE 1

Prediction Reference Choices For P-VOPs in
The Object-Based Temporal Scalability

| ref_select_code | Forward Prediction Reference |
|---|---|
| 00 | Most recent decoded enhancement VOP belonging to the same layer. |
| 01 | Most recent VOP in display order belonging to the reference layer. |
| 10 | Next VOP in display order belonging to the reference layer. |
| 11 | Temporally coincident VOP in the reference layer (no motion vectors) |

TABLE 2

Prediction Reference Choices For B-VOPs In The Case Of Scalability

| ref_select code | Forward Temporal Reference | Backward Temporal Reference |
|---|---|---|
| 00 | Most recent decoded enhancement VOP of the same layer | Temporally coincident VOP in the reference layer (no motion vectors) |
| 01 | Most recent decoded enhancement VOP of the same layer. | Most recent VOP in display order belonging to the reference layer. |
| 10 | Most recent decoded enhancement VOP of the same layer. | Next VOP in display order belonging to the reference layer. |
| 11 | Most recent VOP in display order belonging to the reference layer. | Next VOP in display order belonging to the reference layer. |

The enhancement layer can contain P or B-VOPs, however, in scalability configurations of FIG. 4 and FIG. 5, the B-VOPs in the enhancement layer behave more like P-VOPs at least in the sense that a decoded B-VOP can be used to predict the following P or B-VOPs.

When the most recent VOP in the lower layer is used as reference, this includes the VOP that is temporally coincident with the VOP in the enhancement layer. However, this necessitates use of lower layer for motion compensation which requires motion vectors.

If the coincident VOP in the lower layer is used explicitly as reference, no motion vectors are sent and this mode can be used to provide spatial scalability. Spatial scalability in MPEG-2 uses spatio-temporal prediction, which is accomplished as per FIG. 5 more efficiently by simply using the three prediction modes: forward prediction (prediction direction 1), backward prediction (prediction direction 2), interpolated prediction (prediction directions 1 and 2) available for B-VOPs.

Since the VOPs can have a rectangular shape (picture) or an irregular shape, both the traditional as well as object based temporal and spatial scalabilities become possible. We now provide some details by which scalability can be accomplished for arbitrary shaped VOPs by extending the technique of chroma-keying known in the art. Normally, scalable coding of arbitrary shaped objects requires explicit transmission of shape information of each VOP, however, by use of a simpler technique of chroma-keying in which only rectangular VOPs containing arbitrary shaped VOP are coded such that in the region outside of arbitrary shape of interest a key color (not present anywhere in the VOP) is inserted by the encoder and specified in the bitstream allowing deletion by the decoder, the only caveat is that the key color insertion/deletion is performed not only on arbitrary shape VOPs of lower (here, a base) layer but also in enhancement layer. Thus it becomes possible at the decoder to recover VOPs of scalable arbitrary shape since coding is really performed on rectangular VOP windows in the same manner as coding of pictures.

The class hierarchy introduced in FIG. 2 can be used to implement a practical bitstream representation that may allow ease of access for object manipulation and editing functionalities. For illustrative purposes, they are described with reference to syntax elements from "MPEG-4 Video Verification Model Version 2.1," ISO/IEC JTC1/SC29/WG11, MPEG 96/776 (March 1996) (herein, "VM 2.1"). Tables 3–6 illustrate by example some bitstream details of video syntax class and meaning of various syntax elements in each class, particularly for reorganized or new syntax elements.

TABLE 3

Video Session

| Syntax | No. of bits |
|---|---|
| VideoSession( ) { | |
|     video_session_start_code | 32 |
|     do { | |
|         do { | |
|             VideoObject( ) | |
|         } while (nextbits( ) = = video_object_start_code) | |
|         if (nextbits( )!= session_end_code) | |
|             video_session_start_code | 32 |
|     }while (nextbits( ) != video_session_end_code) | |
|     video_session_end_code | 32 |
| } | |

TABLE 4

Video Object

| Syntax | No. of bits |
|---|---|
| VideoObject( ) { | |
|     video_object_start_code | 24 + 3 |
|     object id | 5 |
|     do { | |
|         VideoObjectLayer( ) | |
|     } while (nextbits( ) = = video_object_layer_start_code) | |
|     next_start_code( ) | |
| } | | object_id: It uniquely identifies a layer. It is a 5-bit quantity with values from 0 to 31.

TABLE 5

Video Object Layer

| Syntax | No. of bits |
|---|---|
| VideoObjectLayer( ) { | |
|     video_object_layer_start_code | 28 |
|     layer_id | 4 |
|     layer_width | 10 |
|     layer_height | 10 |
|     quant_type_sel | 1 |
|     if (quant_type_sel) { | |
|         load_intra_quant_mat | 1 |
|         if (load_intra_quant_mat) | |
|             intra_quant_mat[64] | 8*64 |
|         load_nonintra_quant_mat | 1 |
|         if (load_nonintra_quant_mat) | |
|             nonintra_quant_mat[64] | 8*64 |
|     } | |
|     intra_dcpred_disable | 1 |
|     scalability | 1 |
|     if (scalability) { | |
|         ref_layer_id | 4 |
|         ref_layer_sampling_direc | 1 |
|         hor_sampling_factor_n | 5 |
|         hor_sampling_factor_m | 5 |
|         vert_sampling_factor_n | 5 |
|         vert_sampling_factor_m | 5 |
|         enhancement_type | 1 |
|     } | |
|     do { | |
|         VideoObjectPlane( ) | |
|     } while (nextbits( ) = = video_object_plane_start_code} | |
|     next_start_code( ) | |
| } | | layer_id: It uniquely identifies a layer. It is a 4-bit quantity with values from 0 to 15. A value of 0 identifies the first independently coded layer.
layer_width, layer_height: These values define the spatial resolution of a layer in pixels units.
Scalability: This is a 1-bit flag that indicates if scalability is used for coding of the current layer.
ref_layer_id: It uniquely identifies a decoded layer to be used as a reference for predictions in the case of scalability. It is a 4-bit quantity with values from 0 to 15.
ref_layer_sampling_direc: This is a 1-bit flag whose value when "0" indicates that the reference layer specified by ref_layer_id has the same or lower resolution as the layer being coded. Alternatively, a value of "1" indicates that the resolution of reference layer is higher than the resolution of layer being coded resolution.
hor_sampling_factor_n, hor_sampling_factor_m: These are 5-bit quantities in range 1 to 31 whose ratio hor_sampling_factor_n/ hor_sampling_factor_m indicates the resampling needed in horizontal direction; the direction of sampling is indicated by ref_layer_sampling_direc.
vert_sampling_factor_n, vert_sampling_factor_m: These are 5-bit quantities in range of 1 to 31 whose ratio vert_sampling_factor_n/vert_sampling_factor_m indicates the resampling needed in vertical direction; the direction of sampling is indicated by ref_layer_sampling_direc.
enhancement_type: This is a 1-bit flag that indicates the type of an enhancement structure in a scalability. It has a value of 1̂1̂1̂ when an enhancement layer enhances a partial region of the base layer. It has a value of 1̂0̂1̂ when an enhancement layer enhances entire region of the base layer. The default value of this flag is 1̂0̂1̂.
Other syntax elements such as quant_type_sel and intro_dcpred_disable in the Video Object Layer have the same meaning described in VM 2.1.

TABLE 6

Video Object Plane

| Syntax | No. of bits |
|---|---|
| VideoObjectPlane( ) { | |
|     video_object_plane_start_code | 32 |
|     vop_temp_ref | 16 |
|     vop_visibility | 1 |
|     vop_of_arbitrary_shape | 1 |
|     if (vop_of_arbitrary_shape) { | |

TABLE 6-continued

Video Object Plane

| Syntax | No. of bits |
|---|---|
|     vop_width | 10 |
|     vop_height | 10 |
|     if (vop_visibility) { | |
|         vop_composition_order | 5 |
|         vop_hor_spatial_ref | 10 |
|         marker_bit | 1 |
|         vop_vert_spatial_ref | 10 |
|         vop_scaling | 3 |
|         : | |
|         : | |
|     } | |
|     : | |
|     /* syntax to derive shapes by deleting key color */ | |
|     : | |
| } | |
| vop_coding_type | 2 |
| if (vop_coding_type = = 1 \|\| vop_coding_type = = 2) | |
| { | |
|     vop_fcode_forward | 2 |
|     if (vop_coding_type = = 2) { | |
|         vop_fcode_backward | 2 |
|         vop_dbquant | 2 |
|     } | |
|     else { | |
|         vop_quant | 5 |
|     } | |
|     if (!scalability) { | |
|         separate_motion_texture | 1 |
|         if (!separate_motion_texture) | |
|             combined_motion_texture coding( ) | |
|         else { | |
|             motion_coding( ) | |
|             texture_coding( ) | |
|         } | |
|     } | |
|     else { | |
| : | |
| /* syntax to derive forward and backward shapes by deleting key color */ | 1 |
| : | |
|         } | |
|         ref_select_code | 2 |
|         if (vop_coding_type = = 1 \|\| vop_coding_type = = 2) { | |
|             forward_temporal_ref | 10 |
|             if (plane_coding_type = = 2) { | |
|                 marker__bit | 1 |
|                 backward_temporal_ref | 10 |
|             } | |
|         } | |
|         combined_motion_texture_coding( ) | |
|     } | |
| } | |

The meaning of the syntax elements of video object planes is specified in VM2.1.

The meaning of the syntax elements of video object planes is specified in VM2.1.

Accordingly, the present invention provides a video coding system and syntax supporting generalized scalability. The system finds application with limited or noisy channels and with decoders of varying processing power.

We claim:

1. A video decoding method, comprising, from a stream of coded video data:

identifying data of a coded video object based on a start code indicative thereof, identifying data of a plurality of coded video object layers (VOLs) based on respective VOL start codes, identifying data of a plurality of coded video object planes (VOPs) based on respective VOP start codes, each coded VOP being a member of at most one VOL, determining, from data of a first VOL:

whether scalability had been applied to the first VOL at coding, and if scalability had been applied, identifying from the coded data of the first VOL data a second VOL that is a reference layer to the first VOL, and decoding a VOP from the first VOL with reference to a VOP of the second video object layer.

2. The video decoding method of claim 1, wherein the data of the first VOL comprises, if scalability had been applied, the following fields:

a scalability flag, indicating the use of scalability;

ref_layer_id identifying the second VOL;

ref_layer_sampling_direc, indicating whether the second layer has higher resolution than the layer being coded;

hor_sampling_factor_n identifying a numerator of a ratio to be used in horizontal spatial resampling in scalability;

hor_sampling_factor_m, identifying a denominator of the ratio to be used in horizontal spatial resampling in scalability;

vert_sampling_factor_n, identifying a numerator of a ratio to be used in vertical spatial resampling in scalability; and vert_sampling_factor_m, identifying a denominator of the ratio used in vertical spatial resampling in scalability.

3. The video decoding method of claim 1 wherein data of a VOP may be coded according to one of the following techniques: intra coding, predictive coding and bidirectionally predictive coding, and the method further comprises:

for a predictive coded VOP (P-VOP), decoding the P-VOP data with reference to data of at most one other reference VOP, for a bidirectionally coded VOP (B-VOP), decoding the B-VOP data with reference to data of at most two other reference VOPs.

4. The video decoding method of claim 3, further comprising, for a P-VOP that is a member of a VOL for which scalability had been applied, identifying the reference VOP from a ref_select_code provided in the data of the P-VOP, respective values of the ref_select_code identifying the reference VOP as one of:

a most recently decoded VOP in the VOL to which the P-VOP belongs, a most recent VOP in display order belonging to the reference layer, a next VOP in display order belonging to the reference layer, and a temporally coincident VOP in the reference layer.

5. The video decoding method of claim 4, wherein the ref_select_code is a two bit code.

6. The video decoding method of claim 3, further comprising, for a B-VOP that is a member of a VOL for which scalability had been applied, identifying forward and backward reference VOPs from a ref_select_code provided in the data of the B-VOP, respective values of the ref_select_code identifying the forward and backward reference VOPs as one of:

forward:

a most recently decoded VOP in the VOL to which the B-VOP belongs, and a most recent VOP in display order belonging to the reference layer; and backward:
    a temporally coincident VOP in the reference layer,
    a most recent VOP in display order belonging to the reference layer, and
    a next VOP in display order belonging to the reference layer.

7. The video decoding method of claim 6, wherein the ref_select_code is a two bit code.

8. A video decoder structure for use in a video coding system in which video objects are recognized from video data, instances of a video object at given times are coded as video object planes (VOPs) and VOPs may be assigned to one or more video object layers, the decoder structure comprising:
    a base layer decoder, having an input for VOP data associated with a first video object layer of the video object,
    a midprocessor coupled to an output of the base layer decoder, and
    an enhancement layer decoder, having a first input for VOP data associated with a second video object layer of the video object and a second input coupled to the midprocessor, and responsive to predictive coded VOP (P-VOP) data and, in particular, to a ref_select_code included therein, the enhancement layer coder decodes the P-VOP data with reference to one of:
        data of a VOP most recently decoded by the enhancement layer decoder,
        data of a most recent VOP in display order decoded by the base layer decoder,
        data of a next VOP in display order decoded by the base layer decoder, and
        data of a temporally coincident VOP decoded by the base layer decoder.

9. The decoder structure of claim 8, wherein the midprocessor performs a spatial up sampling of data received from the base layer decoder.

10. The decoder structure of claim 8, wherein the midprocessor performs a spatial down sampling of data received from the base layer decoder.

11. A video decoder structure for use in a video coding system in which video objects are recognized from video data, instances of a video object at given times are coded as video object planes (VOPs) and VOPs may be assigned to one or more video object layers, the decoder structure comprising:
    a base layer decoder, having an input for yap data associated with a first video object layer of the video object,
    a midprocessor coupled to an output of the base layer decoder, and
    an enhancement layer decoder, having a first input for VOP data associated with a second video object layer of the video object and a second input coupled to the midprocessor, and responsive to bidirectionally-predictive coded VOP (B-VOP) data and, in particular, to a ref_select_code included therein, the enhancement layer coder decodes the B-VOP data with reference to forward and backward reference VOPs selected from the group of:
    forward:
        data of a VOP most recently decoded by the enhancement layer decoder, and
        data of a most recent VOP in display order decoded by the base layer decoder; and
    backward:
        data of a temporally coincident VOP decoded by the base layer decoder,
        data of a most recent VOP in display order decoded by the base layer decoder, and
        data of a next VOP in display order decoded by the base layer decoder.

12. In a video coding system in which video objects are recognized from video data, instances of a video object at given times are coded as video object planes (VOPs) and VOPs may be assigned to one or more video object layers, a method of coding data for a video object layer, comprising:
    generating a start code that marks a new video object layer,
    generating a layer id field that uniquely identifies the new video object layer, and
    generating VOP data for the new video object layer, and
    outputting the start code, the layer id field and coded VOP data in a data signal.

13. The method of claim 12 further comprising, if scalability is used for coding of the video object layer, generating the following signals:
    a scalability flag, identifying the use of scalability,
    ref_layer_id identifying a second video object layer to be used as a reference for predictions,
    ref_layer_sampling_direc, indicating whether the second layer has higher resolution than the layer being coded,
    hor_sampling_factor_n, identifying a numerator of a ratio to be used in horizontal spatial resampling in scalability,
    hor_sampling_factor_m identifying a denominator of the ratio to be used in horizontal spatial resampling in scalability,
    vert_sampling_factor_n, identifying a numerator of a ratio to be used in vertical spatial resampling in scalability, and
    vert_sampling_factor_m, identifying a denominator of the ratio used in vertical spatial resampling in scalability.

14. The method of claim 13 wherein lengths of the signals are given by:

| SIGNAL | BIT LENGTH |
| --- | --- |
| scalability flag | 1 |
| ref_layer_id | 4 |
| ref_layer_sampling_direc | 1 |
| hor_sampling_factor_n | 5 |
| hor_sampling_factor_m | 5 |
| vert_sampling_factor_n | 5 |
| vert_sampling_factor_m | 5. |

15. The method of claim 14, further comprising generating respective height and width signals defining the spatial resolution of the video object layer in pixels.

16. A coded video signal generated according to a method, comprising:
    recognizing video objects from video data;
    recognizing instances of a video object at given times as video object planes (VOPs);
    assigning VOPs to one or more video object layers;
    coding data for one of the video object layers, the coding comprising:
        generating a start code that marks the one video object layer, generating a layer id field that uniquely identifies the one video object layer, and coding the VOPs in the one video object layer; and outputting the start code, the layer id field and coded VOP data as the coded data signal.

17. The method of claim 16, further comprising, if scalability is used for coding of the video object layer, generating the following signals:

a scalability flag, identifying the use of scalability, ref_layer_id identifying a second video object layer to be used as a reference for predictions, ref_layer_sampling_direc, indicating whether the second layer has higher resolution than the layer being coded, hor_sampling factor_n, identifying a numerator of a ratio to be used in horizontal spatial resampling in scalability, hor_sampling_factor_m identifying a denominator of the ratio to be used in horizontal spatial resampling in scalability, vert_sampling_factor_n identifying a numerator of a ratio to be used in vertical spatial resampling in scalability, and vert_sampling_factor_m identifying a denominator of the ratio used in vertical spatial resampling in scalability.

18. The method of claim 17, wherein bit lengths of the signals are given by:

| SIGNAL | BIT LENGTH |
|---|---|
| scalability flag | 1 |
| ref_layer_id | 4 |
| ref_layer_sampling_direc | 1 |
| hor_sampling_factor_n | 5 |
| hor_sampling_factor_m | 5 |
| vert_sampling_factor_n | 5 |
| vert_sampling_factor_m | 5. |

19. The method of claim 17, further comprising generating respective height and width signals defining the spatial resolution of the video object layer in pixels.

* * * * *